US012675335B2

(12) United States Patent
Kashyap et al.

(10) Patent No.: US 12,675,335 B2
(45) Date of Patent: Jul. 7, 2026

(54) METHOD AND A SYSTEM FOR PREDICTING A COMBINATION OF OPTIMAL AND STABLE INSTANCES

(71) Applicant: JPMorgan Chase Bank, N.A., New York, NY (US)

(72) Inventors: Rakesh Kumar Kashyap, Bengaluru (IN); Abdul Subhan Shoukat Ghouse, Hyderabad (IN); Srileka Vijayakumar, Bengaluru (IN); Faraz Zaidi, Meerut (IN); Keerthi Chivukula, Visakhapatnam (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 518 days.

(21) Appl. No.: 18/136,477

(22) Filed: Apr. 19, 2023

(65) Prior Publication Data

US 2024/0303132 A1 Sep. 12, 2024

(30) Foreign Application Priority Data

Mar. 6, 2023 (IN) .............................. 202311015044

(51) Int. Cl.
*G06F 9/50* (2006.01)
*G06F 11/34* (2006.01)

(52) U.S. Cl.
CPC ........ *G06F 9/5072* (2013.01); *G06F 11/3433* (2013.01)

(58) Field of Classification Search
CPC .. G06F 9/5072; G06F 11/3433; G06F 9/5027; G06F 2209/5019
See application file for complete search history.

(56) References Cited

U.S. PATENT DOCUMENTS

2006/0150159 A1* 7/2006 Fellenstein ........... G06F 9/5072
717/126
2009/0320039 A1* 12/2009 Garbow ................ G06F 9/4881
718/105
2019/0122409 A1* 4/2019 Meadows ............... G06T 13/40

* cited by examiner

*Primary Examiner* — Jorge A Chu Joy-Davila
(74) *Attorney, Agent, or Firm* — GREENBLUM & BERNSTEIN, P.L.C.

(57) ABSTRACT

A method and a system for providing a combination of optimal and stable instances are disclosed. The method includes receiving a configuration information of an application for execution; identifying parameters related to the application of user; identifying a set of optimal instances based on the identified parameters; fetching a data of historical spot instance(s) from a host platform; predicting a stability score for each of the optimal spot instances based on at least the data of the historical spot instance(s); predicting an intermediate set of optimal and stable spot instances from the at least one optimal spot instance based on the stability score of the optimal spot instances; and predicting the combination of optimal and stable instances, based on at least on a cost factor and based on at least one of the intermediate set of optimal and stable spot instances, and a set of optimal on-demand instances.

20 Claims, 5 Drawing Sheets

Figure 4:
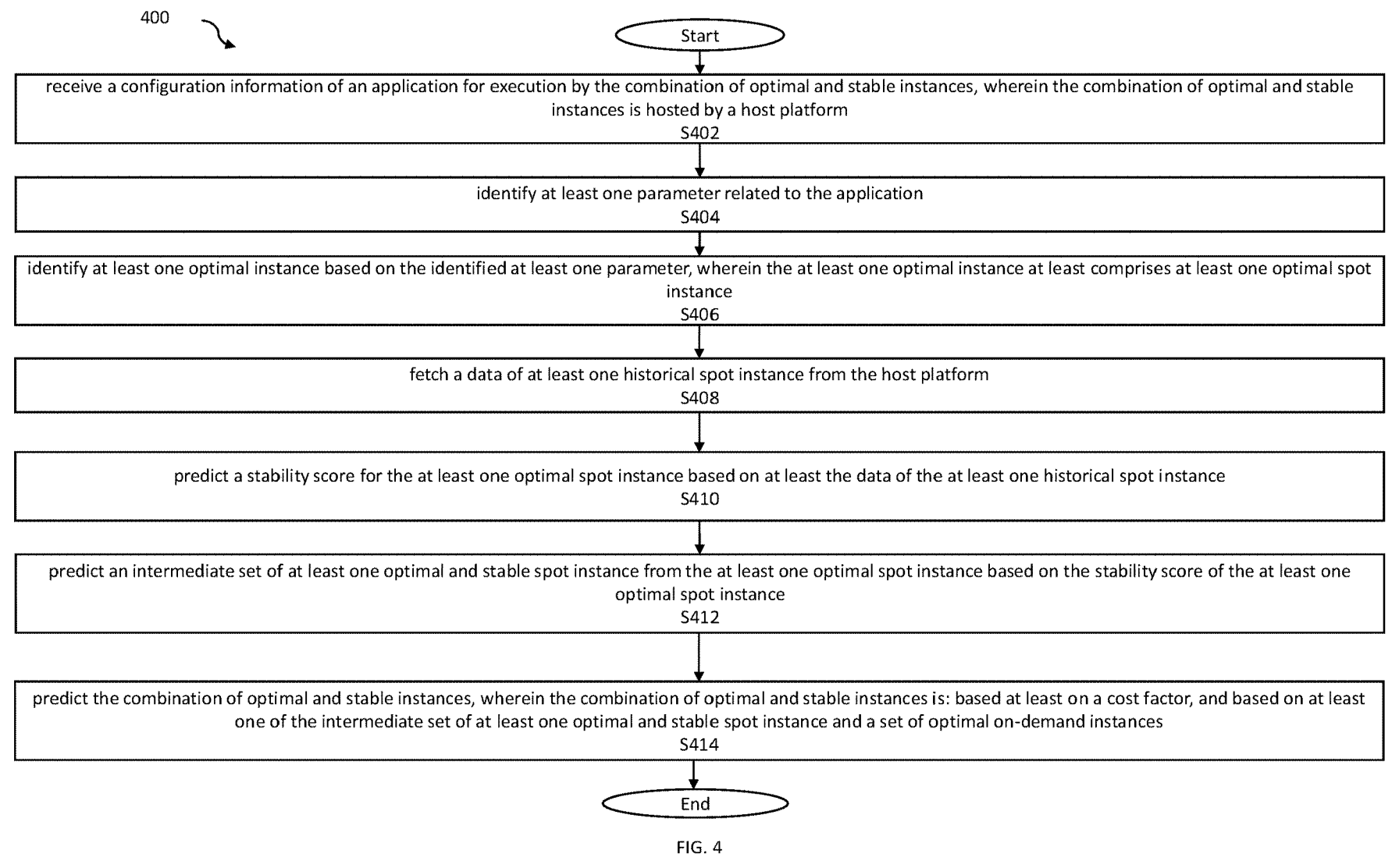

400

Start

↓ receive a configuration information of an application for execution by the combination of optimal and stable instances, wherein the combination of optimal and stable instances is hosted by a host platform
S402

↓ identify at least one parameter related to the application
S404

↓ identify at least one optimal instance based on the identified at least one parameter, wherein the at least one optimal instance at least comprises at least one optimal spot instance
S406

↓ fetch a data of at least one historical spot instance from the host platform
S408

↓ predict a stability score for the at least one optimal spot instance based on at least the data of the at least one historical spot instance
S410

↓ predict an intermediate set of at least one optimal and stable spot instance from the at least one optimal spot instance based on the stability score of the at least one optimal spot instance
S412

↓ predict the combination of optimal and stable instances, wherein the combination of optimal and stable instances is: based at least on a cost factor, and based on at least one of the intermediate set of at least one optimal and stable spot instance and a set of optimal on-demand instances
S414

↓

End

Start obtain a user feedback information of the combination of optimal and stable instances from at least one user
S502 update the machine learning model based on the user feedback information and the combination of optimal and stable instances
S504

End

METHOD AND A SYSTEM FOR PREDICTING A COMBINATION OF OPTIMAL AND STABLE INSTANCES

CROSS-REFERENCE TO RELATED APPLICATIONS

This application claims priority benefit from Indian application No. 202311015044, filed on Mar. 6, 2023 in the India Patent Office, which is hereby incorporated by reference in its entirety.

BACKGROUND

Field of the Disclosure

This technology generally relates to a method and a system for predicting optimal and stable instances and, more particularly, to a method and a system for recommending a combination of at least one from among spot instances and on-demand instances for an application on a cloud-based environment based on certain factors including cost and performance of the spot instances and on-demand instances.

Background Information

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as an admission of the prior art.

With the advent of big data technology, a need to extract knowledge from data collected on a global scale continues to grow. For addressing this need, big data processing technology also continues to develop. In many cases, the data may be dispersed across multiple geographic locations, owned by different entities, and in different formats. For this purpose, data-intensive computing tasks often use data processing frameworks.

Applications running on open-source cluster computing frameworks are generally complex and intensive with respect to computation, volume of data being processed, memory requirements, storage requirements, etc. Also, these applications may involve machine learning (ML) models, and the models may use various complex algorithms like XGboost, decision tree, logistic regression, K-nearest neighbor, etc. that need high computing power. These applications may also consume huge historical data, and hence demand a huge memory and a robust computational capability. Every such application deployed on the cloud is unique with respect to the computational complexity and the volume of data handled and has its own service-level agreement, dependency, frequency, etc.

Identifying an optimal and stable combination of instances meeting all the needs is important with respect to performance and cost trade-offs. This, in the presently known solutions, is performed manually and on a trial-and-error basis, which involves humongous efforts and is time-consuming. Also, since the existing solutions are based on human skills and input, the outputs prove to be inefficient in many cases.

Hence, in view of these and other existing limitations/drawbacks, there arises an imperative need for an automated system to overcome the above-mentioned limitations and other known limitations, and to provide a method and a system for predicting an optimal and stable combination of at least one from among spot instances and on-demand instances taking in view the total cost and performance parameters while running various applications.

This will help the users reduce costs of resource consumption, due to optimization of resource utilization. Also, errors introduced in the process due to manual intervention may be reduced.

SUMMARY

The present disclosure, through one or more of its various aspects, embodiments, and/or specific features or sub-components, provides, inter alia, various systems, servers, devices, methods, media, programs, and platforms for predicting and recommending a combination of at least one of one or more spot instances and one or more on-demand instances for an application on a cloud space based on certain factors including cost and performance.

According to an aspect of the present disclosure, a method for providing a combination of optimal and stable instances is disclosed. The method is implemented by at least one processor. The method may include receiving, by the at least one processor via a communication interface, a configuration information of an application for execution by the combination of optimal and stable instances, wherein the combination of optimal and stable instances is hosted by a host platform; identifying, by the at least one processor, at least one parameter related to the application; identifying, by the at least one processor, at least one optimal instance based on the identified at least one parameter, wherein the at least one optimal instance comprises at least one optimal spot instance; fetching, by the at least one processor, a data of at least one historical spot instance from the host platform; predicting, by the at least one processor, a stability score for each of the at least one optimal spot instance based on at least the data of the at least one historical spot instance; predicting, by the at least one processor, an intermediate set of at least one optimal and stable spot instance from the at least one optimal spot instance based on the stability score of the at least one optimal spot instance; and predicting, by the at least one processor, the combination of optimal and stable instances, wherein the combination of optimal and stable instances is based on at least on a cost factor, and is based on at least one of the intermediate set of at least one optimal and stable spot instance and a set of optimal on-demand instances.

In accordance with an exemplary embodiment, the at least one parameter includes at least a size, a computation complexity, and a memory.

In accordance with an exemplary embodiment, each of the at least one parameter is assigned a weightage.

In accordance with an exemplary embodiment, the combination of optimal and stable instances is predicted based on the weightage.

In accordance with an exemplary embodiment, the data of the at least one historical spot instance comprises information of a spot instance interruption frequency of the at least one historical spot instance for a pre-defined period of time.

In accordance with an exemplary embodiment, the at least one processor implements a machine learning model, wherein the machine learning model is trained by the at least one processor.

In accordance with an exemplary embodiment, the training of the machine learning model by the at least one processor comprises obtaining, by the at least one processor via the communication interface, a user feedback information of the combination of optimal and stable instances from at least one user; and updating, by the at least one processor, the machine learning model implemented by the at least one processor based on the user feedback information and the combination of optimal and stable instances.

According to another aspect of the present disclosure, a computing device configured to implement an execution of a method for predicting a combination of optimal and stable instances is disclosed. The computing device comprises a processor; a memory; and a communication interface coupled to each of the processor and the memory, wherein the processor may be configured to: receive, via the communication interface, a configuration information of an application for execution by the combination of optimal and stable instances, wherein the combination of optimal and stable instances is hosted by a host platform; identify at least one parameter related to the application; identify at least one optimal instance based on the identified at least one parameter, wherein the at least one optimal instance at least comprises at least one optimal spot instance; fetch a data of at least one historical spot instance from the host platform; predict a stability score for each of the at least one optimal spot instance based on at least the data of the at least one historical spot instance; predict an intermediate set of at least one optimal and stable spot instance from the at least one spot instance based on the stability score of the at least one optimal spot instance; and predict the combination of optimal and stable instances, wherein the combination of optimal and stable instances is: based at least on a cost factor, and based on at least one of the intermediate set of at least one optimal and stable spot instance and a set of optimal on-demand instances.

In accordance with an exemplary embodiment, the at least one parameter includes at least a size, a computation complexity, and a memory.

In accordance with an exemplary embodiment, each of the at least one parameter is assigned a weightage.

In accordance with an exemplary embodiment, the combination of optimal and stable instances is predicted based on the weightage.

In accordance with an exemplary embodiment, the data of at least one historical spot instance comprises information of a spot instance interruption frequency of the at least one historical spot instance for a pre-defined period of time.

In accordance with an exemplary embodiment, the processor implements a machine learning model, wherein the machine learning model is trained by the processor.

In accordance with an exemplary embodiment, the processor for training of the machine learning model, is further configured to: obtain, via the communication interface, a user feedback information of the combination of optimal and stable instances from at least one user; and update the machine learning model implemented by the processor based on the user feedback information and the combination of optimal and stable instances.

According to yet another aspect of the present disclosure, a non-transitory computer readable storage medium storing instructions for predicting a combination of optimal and stable instances is disclosed. The storage medium include executable code which, when executed by a processor, may cause the processor to: receive via a communication interface, a configuration information of an application for execution by the combination of optimal and stable instances, wherein the combination of optimal and stable instances is hosted by a host platform; identify at least one parameter related to the application; identify at least one optimal spot instance based on the identified at least one parameter; fetch a data of at least one historical spot instance from the host platform; predict a stability score for each of the at least one optimal spot instance based on at least the data of the at least one historical spot instance; predict an intermediate set of at least one optimal and stable spot instance from the at least one optimal spot instance based on the stability score of the at least one optimal spot instance; and predict the combination of optimal and stable instances, wherein the combination of optimal and stable instances is: based at least on a cost factor, and based on at least one of the intermediate set of at least one optimal and stable spot instance and a set of optimal on-demand instances.

In accordance with an exemplary embodiment, the at least one parameter includes at least a size, a computation complexity, and a memory.

In accordance with an exemplary embodiment, each of the at least one parameter is assigned a weightage.

In accordance with an exemplary embodiment, the combination of optimal and stable instances is predicted based on the weightage.

In accordance with an exemplary embodiment, the data of at least one historical spot instance comprises information of a spot instance interruption frequency of the at least one historical spot instance for a pre-defined period of time.

In accordance with an exemplary embodiment, when executed by the processor, the executable code may further cause the processor to implement a machine learning model, wherein the machine learning model is trained by the processor.

In accordance with an exemplary embodiment, when executed by the processor, the executable code may further cause the processor to train the machine learning model, which is further configured to: obtain, via the communication interface, a user feedback information of the combination of optimal and stable instances from at least one user; and update the machine learning model implemented by the processor based on the user feedback information and the combination of optimal and stable instances.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

FIG. 4 is a flowchart of an exemplary process for implementing a method for predicting a combination of optimal and stable instances, in accordance with an exemplary embodiment.

DETAILED DESCRIPTION

Figure 1:
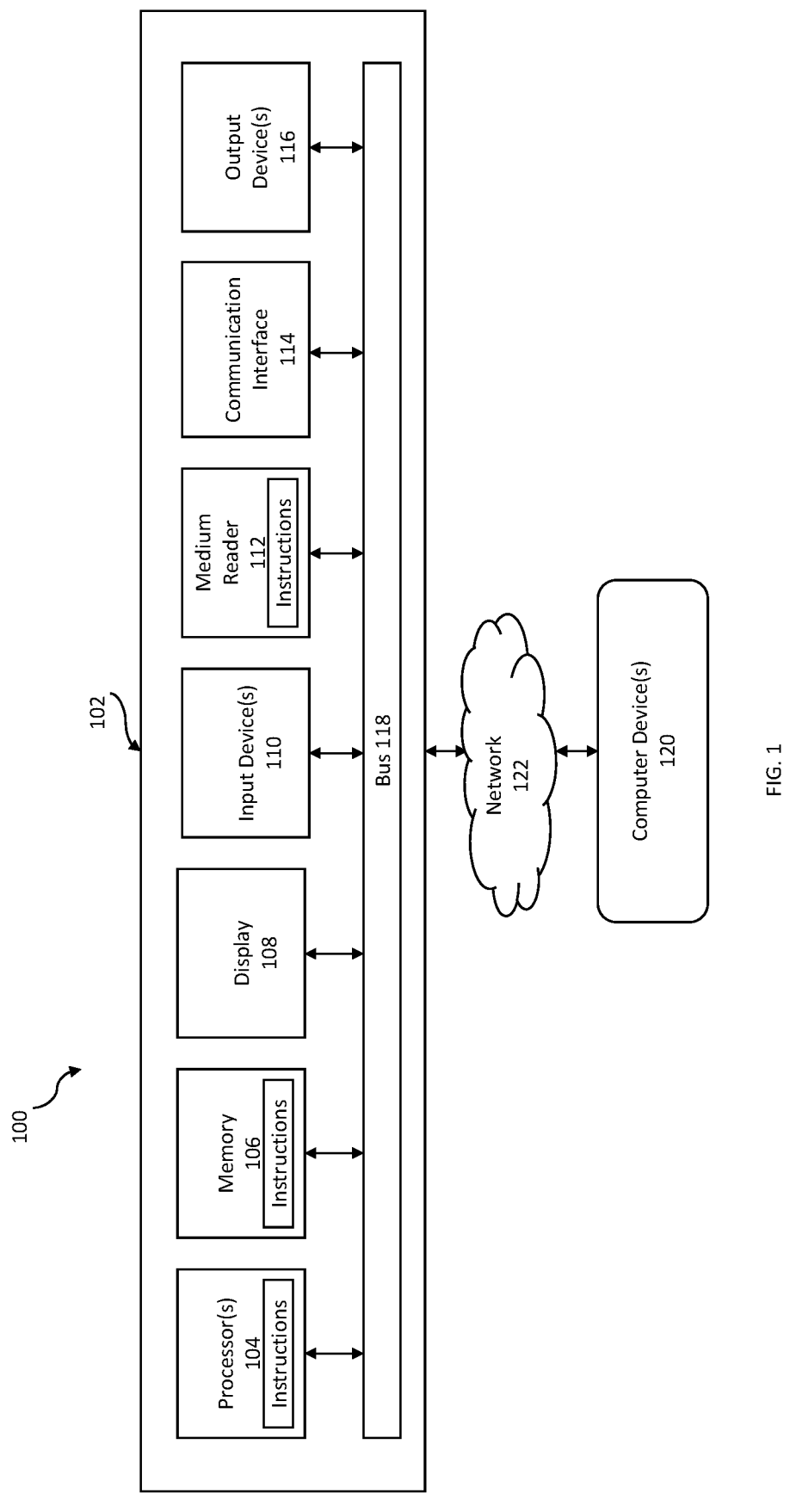
FIG. 1 illustrates an exemplary computer system for predicting a combination of optimal and stable instances in accordance with an exemplary embodiment.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases/terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome the problems associated with the identification of optimal and stable instances, for cost and performance optimization, the present disclosure provides a method and system for predicting a combination of optimal and stable instances. The computing device or system first receives a configuration information of an application for execution by the combination of optimal and stable instances, wherein the combination of optimal and stable instances is hosted by a host platform. The application for execution may be an application running on an open-source cluster computing framework. This application may generally be complex and intensive with respect to computation, volume of data being processed, memory requirements, storage requirements, etc. Further, the system is configured to identify parameters related to the application, such as size, computational complexity, and memory/storage requirements. Further, the system is configured to identify optimal instances based on the identified parameters, wherein the at least one optimal instance at least includes at least one optimal spot instance. This set of at least one optimal instance may also include at least one on-demand instance. Further, the system is configured to fetch a data of at least one historical spot instance from the host platform. The data of the at least one historical spot instance may include the stability data of various spot instances at various time points. This data of the at least one historical spot instance may be renewed on a monthly basis, and the data of, say, past few months may be fetched by the system. Further, the system is configured to predict a stability score for each of the identified spot instances based on at least the data of the at least one historical spot instance. Further, the system is configured to predict an intermediate set of at least one optimal and stable spot instance from the at least one optimal spot instance based on the stability score of the at least one optimal spot instance. Further, the system is configured to predict a combination of optimal and stable instances based at least on a cost factor. The combination of optimal and stable instances recommended by the system to the user includes at least one from among: the intermediate set of optimal and stable spot instances and a set of optimal on-demand instances.

FIG. 1 is an exemplary system for use in accordance with the embodiments described herein. The system 100 is generally shown and may include a computer system 102, also known as computing device 102, which is generally indicated to predict a combination of optimal and stable instances.

The computer system 102 may include a set of instructions that can be executed to cause the computer system 102 to perform any one or more of the methods and/or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks and/or cloud-based environment. Even further, the instructions may be operative in such cloud-based computing environment.

In a networked deployment, the computer system 102 may operate in the capacity of a server or as a client user computer in a server-client user network environment, a client user computer in a cloud-based computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, an "instance" refers to a "cloud instance" that is a virtual server instance from a public or private cloud-based network. In cloud instance computing, single hardware is implemented into software and run-on top of multiple computers. An elastic cloud computing (EC2) spot instance is an unused EC2 instance that is available for being used by the users. Also, on-demand instances are dedicated instances, that are always stable, for which a user pays for the computational capacity for a specific use-time period, say, for a few hours or minutes. A spot instance is available for a significantly lesser cost as compared with the cost of a dedicated on-demand instance. The usage of spot instance(s) can significantly reduce the overall EC2 costs.

FIG. 1 is an exemplary system for use in accordance with the embodiments described herein. The system 100 is generally shown and may include a computer system 102, also known as computing device 102, which is generally indicated to predict a combination of optimal and stable instances in accordance with an exemplary embodiment.

The computer system 102 may include a set of instructions that can be executed to cause the computer system 102 to perform any one or more of the methods and/or computer-based functions disclosed herein, either alone or in combination with the other described devices. The computer system 102 may operate as a standalone device or may be connected to other systems or peripheral devices. For example, the computer system 102 may include or be included within, any one or more computers, servers, systems, communication networks and/or cloud-based environment. Even further, the instructions may be operative in such cloud-based computing environment.

In a networked deployment, the computer system 102 may operate in the capacity of a server or as a client user computer in a server-client user network environment, a client user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecured and/or unencrypted. As regards the present invention, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer ('PC'). However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or computing device commonly known and understood in the art without departing from the scope of the present application. For example, the computer device 120 may be the same or similar to the computer system 102. Furthermore, those skilled in the art similarly understand that the device may be any combination of computing devices.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for predicting a combination of optimal and stable instances based on an execution of at least one instruction.

As described herein, various embodiments provide optimized methods and systems for predicting a combination of at least one of optimal and stable instances and optimal on-demand instances for an application on a cloud-based environment based on certain factors including cost and performance.

Figure 2:
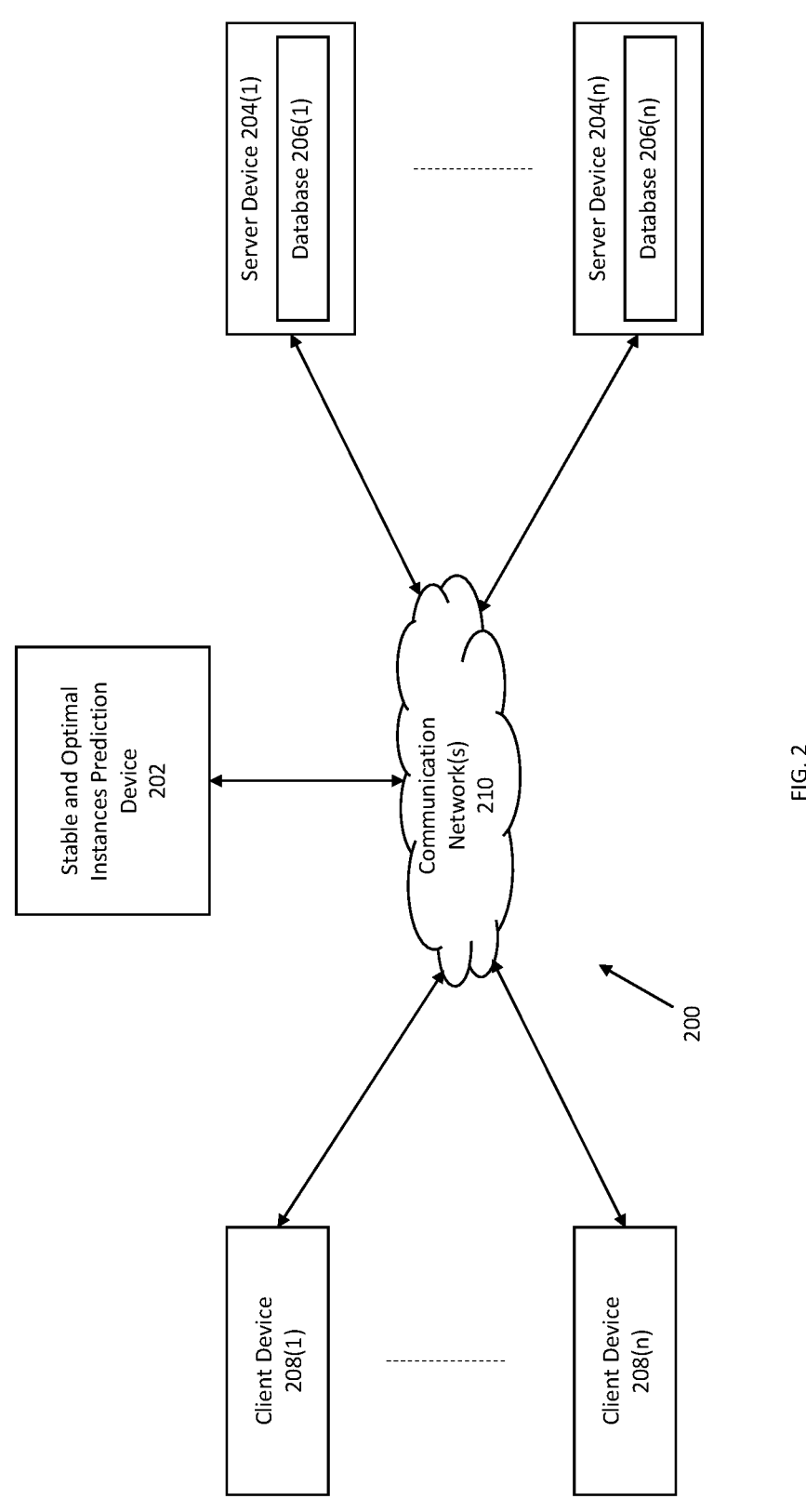
FIG. 2 illustrates an exemplary diagram of a network environment for predicting a combination of optimal and stable instances in accordance with an exemplary embodiment.

Referring to FIG. 2, a schematic of an exemplary network environment 200 for implementing a method for predicting a combination of optimal and stable instances is illustrated in accordance with an exemplary embodiment. In an exemplary embodiment, the method is executable on any networked computer platform, such as, for example, a personal computer (PC).

The method for predicting a combination of optimal and stable instances may be implemented by a Stable and Optimal Instances Prediction (SOIP) device 202. The SOIP device 202 may be the same or similar to the computer system 102 as described with respect to FIG. 1. The SOIP device 202 may store at least one application that can include executable instructions that, when executed by the SOIP device 202, cause the SOIP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SOIP device 202 itself, may be located in virtual server(s) running in a cloud-based computing environment rather than being tied to one or more specific physical network computing devices. Also, the application(s) may be running in one or more virtual machines (VMs) executing on the SOIP device 202. Additionally, in one or more embodiments of this technology, virtual machine(s) running on the SOIP device 202 may be managed or supervised by a hypervisor.

In the network environment 200 of FIG. 2, the SOIP device 202 is coupled to a plurality of server devices 204(1)-204(n) that hosts a plurality of databases 206(1)-206(n), and also to a plurality of client devices 208(1)-208(n) via communication network(s) 210. A communication interface 114 of the SOIP device 202, such as the network interface of the computer system 102 of FIG. 1, operatively couples and communicates between the SOIP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SOIP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable storage medium, and SOIP devices that efficiently implement a method for predicting a combination of optimal and stable instances, the method being implemented by at least one processor.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), Public Switched Telephone Networks (PSTNs), Ethernet-based Packet Data Networks (PDNs), combinations thereof, and the like.

The SOIP device 202 may be a standalone device or integrated with one or more other devices or computing devices, such as one or more of the server devices 204(1)-204(n), for example. In one particular example, the SOIP device 202 may include or be hosted by one of the server devices 204(1)-204(n), and other arrangements are also possible. Moreover, one or more of the devices of the SOIP device 202 may be in a same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface 114, which are coupled together by a bus or other communication link, although other numbers and/or types of network devices may be used. The server devices 204(1)-204(n) in this example may process requests received from the SOIP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical data that relates to stability of spot instances hosted at the host platform, other instance details of the instances hosted at the host platform, user feedback data after using the stable instances as was predicted by the system in the past, etc.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SOIP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, eg., a smartphone.

The client devices 208(1)-208(n) may run interface applications, such as standard web browsers or standalone client applications, which may provide an interface to communicate with the SOIP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SOIP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SOIP device 202, the server devices 204(1)-204(n), or the client devices 208(1)-208(n), for example, may be configured to operate as virtual instances on the same physical machine. In other words, one or more of the SOIP device 202, the server devices 204(1)-204(n), or the client devices 208(1)-208(n) may operate on the same physical device rather than as separate devices communicating through communication network(s) 210. Additionally, there may be more or fewer SOIP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
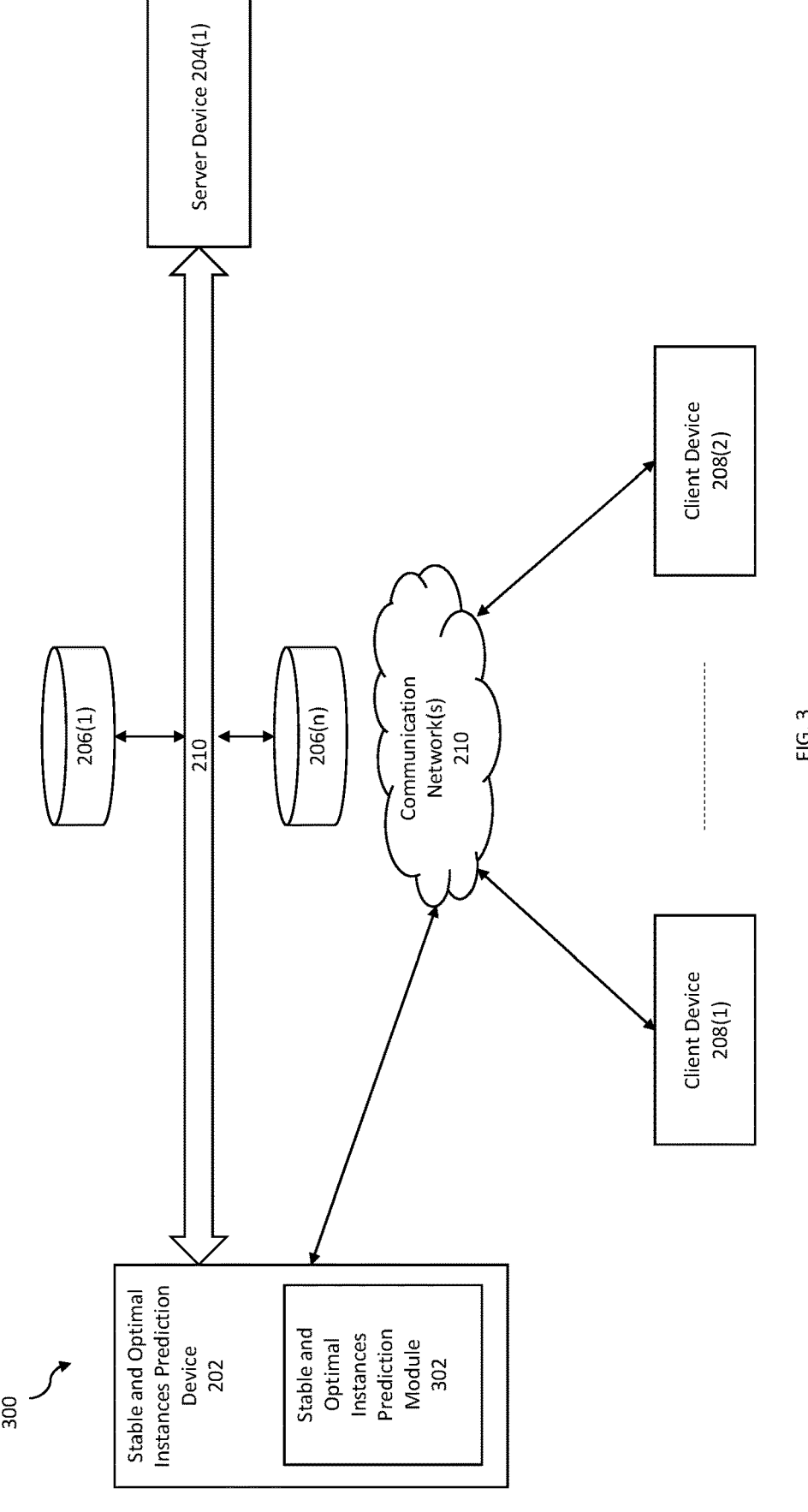
FIG. 3 shows an exemplary system for implementing a method for predicting a combination of optimal and stable instances, in accordance with an exemplary embodiment.

FIG. 3 illustrates an exemplary system for implementing a method for predicting an intermediate set of stable instances based on the stability scores of the at least one spot instance, in accordance with an exemplary embodiment. As illustrated in FIG. 3, according to exemplary embodiments, the system 300 may comprise an SOIP device 202 including an SOIP module 302 that may be connected to a server device 204(1) and at least one repository 206(1) . . . 206(n) via a communication network 210, but the disclosure is not limited thereto.

The SOIP device 202 is described and shown in FIG. 3 as including Stable and Optimal Instances Prediction (SOIP) module 302, although it may include other rules, policies, modules, databases, or applications, for example. As will be described below, the Stable and Optimal Instances Prediction (SOIP) module 302 is configured to implement a method for predicting a combination of optimal and stable instances.

An exemplary process 300 for implementing a mechanism for predicting an intermediate set of optimal and stable spot instances based on the stability scores of the at least one optimal spot instance by utilizing the network environment of FIG. 2 is shown as being executed in FIG. 3. Specifically, a first client device 208(1) and a second client device 208(2) are illustrated as being in communication with SOIP device 202. In this regard, the first client device 208(1) and the second client device 208(2) may be "clients" of the SOIP device 202 and are described herein as such. Nevertheless, it is to be known and understood that the first client device 208(1) and/or the second client device 208(2) need not necessarily be "clients" of the SOIP device 202, or any entity described in association therewith herein. Any additional or alternative relationship may exist between either or both of the first client device 208(1) and the second client device 208(2) and the SOIP device 202, or no relationship may exist.

Further, SOIP device 202 is illustrated as being able to access the one or more repositories 206(1) . . . 206(n). The SOIP module 302 may be configured to access these repositories/databases for implementing a method for predicting an intermediate set of optimal and stable spot instances based on the stability scores of the at least one optimal spot instance.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SOIP device 202 via broadband or cellular communication. Of course, these embodiments are merely exemplary and are not limiting or exhaustive.

Referring to FIG. 4, an exemplary method 400 is shown for predicting a combination of optimal and stable instances, in accordance with an exemplary embodiment of the present disclosure. As shown in FIG. 4, the method begins at step 402 following the receipt of a request for executing an application by a user. This application may be an application that runs on an open-source cluster computing framework. Such applications are generally complex and intensive with respect to computation, volume of data being processed, memory requirements, storage requirements, etc. Each such application has different requirements of computing systems for execution. Thus, at step 402, the method may include receiving, by the at least one processor 104 via a communication interface 114, a configuration information of an application for execution by the combination of optimal and stable instances, wherein the combination of optimal and stable instances is hosted by a host platform. The configuration information may include an information regarding processing cores and memory requirements for executing the application, and such other information that relates to hardware requirements for executing the application. Also, in a non-limiting embodiment, the configuration information of a known application may already be stored in one of the databases 206(1)-206(n), and may accordingly be fetched by the processor, when required.

Analyzing the configuration information, at step 404, the processor 104 identifies at least one parameter that relates to the application. For this purpose, in a non-limiting embodiment, the system 100 may implement a logistical regression model. In a non-limiting embodiment, the at least one parameter may include at least a size, a computation complexity, and a memory. The size may refer to the number of cores, threads, etc. that constitute to form a processing machine. For example, the size may depend on the number of cores, executors, and threads present in a machine that can be used to execute any application. Similarly, computation complexity and memory are also predicted by the at least one processor 104. A person skilled in the art would appreciate that these parameters are exemplary and do not restrict the present disclosure in any possible manner. When the user sends the request for executing the application to the system 100, the trained model implemented in the at least one processor 104 predicts the parameters such as the size, the computational complexity, and the memory and assigns a weightage to the same. For example, a set of the parameters for various applications is given below:

Further, at step 406, the method may include identifying, by the processor 104, at least one optimal instance that is capable of executing the application. The at least one optimal instance that is capable of executing the application may be available as a spot instance or an on-demand instance. This identification is done on the basis of the identified parameters and/or their weightages. So, in this step 406, the processor 104 identifies all the instances available at the host platform that in some or the other combinations can execute the application. This identification may be based on the already known technical specifications of these instances available with the host platform. For example, "3 units of Type2 and 4 units of Type 6" may be required to run the application and such other combinations of other instances may be predicted in this step. This exemplary combination of "3 units of Type2 and 4 units of Type6" should be considered as one that is together required to execute the application and other such combinations may also be predicted. A person skilled in the art would appreciate that the above example is for understanding purposes only and does not limit this present disclosure in any possible manner.

| No. of executors | No. of cores | Executor memory | Driver memory | Total cores | Total memory (GB) | Run time (min.) | Size | Computational requirements/ complexity | Memory |
|---|---|---|---|---|---|---|---|---|---|
| 20 | 5 | 18 G | 25 G | 100 | 360 | 10 | s | m | s |
| 75 | 5 | 25 G | 10 G | 375 | 1875 | 70 | l | m | m |
| 50 | 5 | 25 G | 20 G | 300 | 1800 | 72 | l | m | m |
| 50 | 5 | 20 G | 10 G | 250 | 1000 | 10 | m | m | m |
| 20 | 5 | 20 G | 10 G | 100 | 400 | 30 | s | m | m |
| 50 | 5 | 25 G | 25 G | 250 | 1250 | 15 | m | m | m |

A person skilled in the art would appreciate that the above set of parameters are merely exemplary and do not limit the present disclosure in any possible manner. Also, in the above table, the last three columns indicate the weightage of the parameters, that are predicted by the logistical regression model considering all previous columns as inputs to the model, wherein 's' denotes small, 'm' denotes medium, and 'l' denotes large. Also, the weightages of size, computational requirements/complexity and memory may be predicted as xs (extra-small), s (small), m (medium), l (large), xl (extra-large). Also, the instances that are selected are based on the requirements of the application which is to be executed. Some exemplary instances are provided below:

| Instance Type | vCPU | Memory (GiB) | Instance Storage | Network Bandwidth (Gbps) | EBS Bandwidth (Mbps) |
|---|---|---|---|---|---|
| Type1 | 32 | 64 | EBS-only | 12 | 9000 |
| Type2 | 48 | 96 | EBS-only | 20 | 13500 |
| Type3 | 64 | 128 | EBS-only | 25 | 19000 |
| Type4 | 1 | 8 | EBS-only | Up to 10 | Up to 4750 |
| Type5 | 32 | 256 | EBS-only | 12 | 9000 |
| Type6 | 48 | 384 | EBS-only | 20 | 13500 |
| Type7 | 64 | 512 | EBS-only | 25 | 19000 |

A person skilled in the art would appreciate that the above set of instance types is for understanding purposes only and does not limit or restrict the present disclosure in any possible manner.

At step 408, the method may include fetching, by the at least one processor, a data of at least one historical spot instance from the host platform. This data of the at least one historical spot instance may be available at the server of the host platform. Alternatively, the data of the at least one historical spot instance is stored in the databases 206(1)-206(n) and fetched by the processor 104 from the databases 206(1)-206(n). The data of the at least one historical spot instance may include a spot instance interruption frequency of the at least one historical spot instance for a pre-defined period of time. For example, the data may show the stability of an instance in terms of frequency of interruptions that occurred in said instance in the past 1 month. An exemplary set of data of the at least one historical spot instance available from the host platform is given below:

| Instance Type | vCPU | Memory (GiB) | Frequency of Interruption |
|---|---|---|---|
| Type1 | 2 | 16 | <5% |
| Type2 | 4 | 16 | <5% |
| Type3 | 16 | 128 | <5% |
| Type4 | 2 | 8 | <5% |
| Type5 | 2 | 16 | <5% |
| Type6 | 4 | 8 | <5% |

A person skilled in the art would appreciate that the above set of data of the at least one historical spot instance is merely exemplary and does not limit the present disclosure in any possible manner. In a non-limiting embodiment, the data of all available spot instances is fetched. In another non-limiting embodiment, the data related to only the identified optimal instances is fetched by the at least one processor. In a non-limiting embodiment, the date column is divided to represent the day, month, year, hour, hour division and weekday separately in different columns in order to check for seasonality and trend. For example, Day of week—(0-6) [Monday-Sunday]; Hour Division—[Early Morning, Morning, Afternoon, Evening, Night and Mid Night]; Weekday—0 (Weekend) and 1 (Weekday) may be retrieved and analyzed.

Further, based on the data of the at least one historical spot instance, at step 410, the method may include predicting, by the at least one processor, a stability score for each of the at least one optimal spot instance based on at least the data of the at least one historical spot instance. For example, spot instance(s) from the at least one optimal instance may be checked for their stability in this step, where the stability is based on a stability score for the spot instance(s). More particularly, this stability score may be calculated by using at least a historical data that relates to stability of the at least one historical spot instance. The historical data may include a frequency of interruption for each of these historical spot instances. Thus, the stability score of any spot instance is determined based on the frequency of interruption of the spot instance when the spot instance was previously used. For this purpose, the at least one processor may implement a XG Boost Regressor model, as already known in the current state of the art. Further, this model may provide a stability score for each of the at least one optimal spot instance identified in step 406. An exemplary set of data of such available optimal spot instances from the host platform is given below.

stable spot instance from an intermediate set of optimal and stable spot instances only, or at least one optimal on-demand instance only, or may be a combination of both. Further, in an exemplary embodiment, various combinations may also be shown to the user for selecting the desired combination. For example, along with the combination of instances along with its costs and other parameters, the user might be shown other combinations along with their respective costs and other parameters. The user may want to select any combination of instances other than the combination of instances provided by the system. Also, the combination of optimal and stable instances may be predicted by the at least one processor 104 based on the weightage. Thus, after taking into account the factors such as cost of machines/instances, performance factors, parameters that relate to the application such as size, computation complexity, memory requirements, the at least one processor 104 predicts the number of spot instances, and the number of on-demand instances that are required for executing the application. For this purpose, the system may implement a knapsack algorithm which considers various factors such as cost, etc. to identify the right combination of spot and on-demand instances. In a non-limiting embodiment, the processor 104 for this purpose uses other instance details such as details regarding on-demand instances, available spot instances, etc. For example, the processor 104 may use details such as the cost of available spot instances as well as on-demand instances for this purpose. Some or all of these details may be fetched by the processor 104 from databases 206(1)-206(n), and

| Date | Instance Type | vCPU | Memory (GB) | Frquency of Interruption | Hour | Month | Day of Week | Year | Day | Hour - division | Weekday | Instance label | Stability Score |
|---|---|---|---|---|---|---|---|---|---|---|---|---|---|
| Jun. 17, 2022 07:43 | Type 1 | 2 | 16 | <5% | 7 | 6 | 4 | 2022 | 17 | Morning | Weekday | 440 | 2.5 |
| Jun. 17, 2022 17:43 | Type 2 | 4 | 16 | 5-10% | 7 | 6 | 4 | 2022 | 17 | Evening | Weekday | 210 | 7.5 |
| Jun. 17, 2022 21:43 | Type 3 | 16 | 128 | <5% | 7 | 6 | 4 | 2022 | 18 | Night | Weekend | 412 | 2.5 |

A person skilled in the art the art would appreciate that the above set of data of the at least one historical spot instance is only exemplary and does not limit the present disclosure in any possible manner. Also, it is pertinent to mention here that in the above set of data, a lesser stability score indicates a higher stability of an instance.

Thus, at step 412, the method may include predicting, by the at least one processor, an intermediate set of at least one optimal and stable spot instance from the at least one optimal spot instance based on the stability scores of the at least one optimal spot instance. This at least one optimal and stable spot instance may be used by the user to execute the application.

At step 414, the method may include predicting, by the at least one processor, the combination of optimal and stable instances, wherein the combination of optimal and stable instances is based at least on a cost factor and includes at least one of the intermediate set of at least one optimal and stable spot instance and a set of optimal on-demand instances. Thus, in this step 414, the processor 104 is configured to predict a combination of optimal and stable instances that are capable of executing the application and is available in minimum costs. This combination of optimal and stable instances may include at least one optimal and alternatively some other details or all such details may be fetched by the processor 104 from the host platform.

Figure 5:
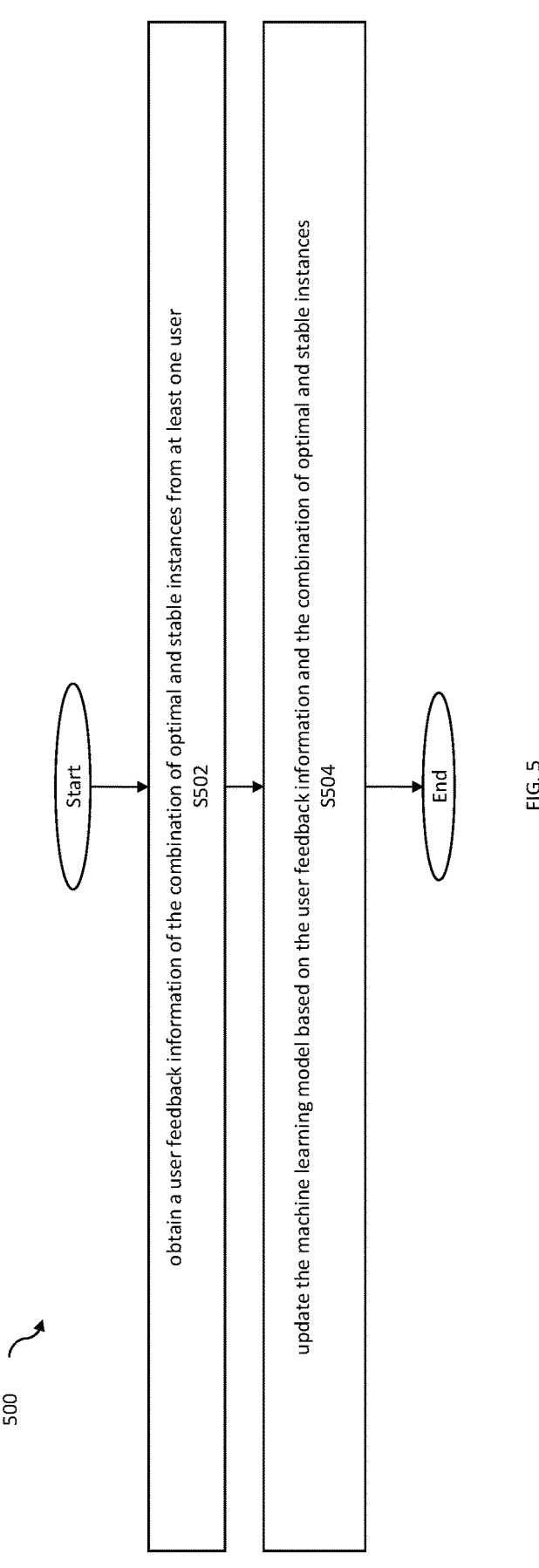
FIG. 5 is a flow diagram that is usable for implementing a method for predicting a combination of optimal and stable instances, in accordance with an exemplary embodiment.

In a non-limiting embodiment, the at least one processor 104 for predicting the intermediate set of optimal and stable spot instances, as well as for predicting the combination of optimal and stable instances, implements a machine learning model wherein the machine learning model is trained by the at least one processor 104. Also, the training of the machine learning model by the at least one processor 104 includes method steps as shown in FIG. 5. Now referring to FIG. 5 which illustrates a flow diagram that is usable for implementing a method for predicting a combination of optimal and stable instances, in accordance with an exemplary embodiment. In a non-limiting embodiment, at step 502, the method may include obtaining, by the at least one processor 104 via the communication interface 114, a user feedback information of the combination of optimal and stable instances from at least one user. Thus, in this step, the user feedback is taken by the system 100. For instance, the user feedback may include indication of performance of the combination of optimal and stable instances. This user feedback information is then used to update the model at step 504. Thus, at step 504, the method may include updating, by the at least one processor, the machine learning model implemented by the at least one processor 104 based on the user feedback information and the combination of optimal and stable instances. If the user feedback is positive, then an information relating to the combination of optimal and stable instances predicted by the system is stored in the database. However, if the user feedback is negative, a stability score of one or more spot instances in the combination of optimal and stable instances, is updated with the highest stability score and then stored in the database.

Additionally, according to an aspect of the present disclosure, a non-transitory computer readable storage medium storing instructions for predicting a combination of optimal and stable instances is disclosed. The storage medium include executable code which, when executed by a processor, may cause the processor to: receive via a communication interface, a configuration information of an application for execution by the combination of optimal and stable instances, wherein the combination of optimal and stable instances is hosted by a host platform; identify at least one parameter related to the application; identify at least one optimal instance based on the identified at least one parameter, wherein the at least one optimal instance comprises at least one optimal spot instance; fetch a data of at least one historical spot instance from the host platform; predict a stability score of the at least one optimal spot instance based on at least the data of the at least one historical spot instance; predict an intermediate set of at least one optimal and stable spot instance from the at least one optimal spot instance based on the stability score of the at least one optimal spot instance; and predict the combination of optimal and stable instances, wherein the combination of optimal and stable instances is based at least on a cost factor, and is based on at least one of the intermediate set of at least one optimal and stable spot instance and a set of optimal on-demand instances.

In accordance with an exemplary embodiment, the at least one parameter include at least a size, a computation complexity, and a memory, and each of the at least one parameter is assigned a weightage. Also, the combination of optimal and stable instances is predicted based on the weightage and the data of at least one historical spot instance comprises a spot instance interruption frequency of the at least one historical spot instance for a pre-defined period of time. Further, when executed by the processor, the executable code may further cause the processor to implement a machine learning model, wherein the machine learning model is trained by the processor. Also, when executed by the processor, the executable code may further cause the processor to train the machine learning model which is further configured to: obtain, via the communication interface, a user feedback information of the combination of optimal and stable instances from at least one user; and update the machine learning model implemented by the processor based on the user feedback information and the combination of optimal and stable instances.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of computing device and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for predicting a combination of optimal and stable instances, the method being implemented by at least one processor, the method comprising:

receiving, by the at least one processor via a communication interface, a configuration information of an application for execution by the combination of optimal and stable instances, wherein the combination of optimal and stable instances is hosted by a host platform, wherein "optimal" refers to instances selected based on performance and cost factors, and "stable" refers to instances selected based on historical reliability and availability factors;

identifying, by the at least one processor, at least one parameter related to the application; identifying, by the at least one processor, at least one optimal instance based on the identified at least one parameter, wherein the at least one optimal instance comprises at least one optimal spot instance; fetching, by the at least one processor, historical performance data of at least one historical spot instance from the host platform; predicting, by the at least one processor, a stability score for the at least one optimal spot instance based on at least the historical performance data of the at least one historical spot instance;

predicting, by the at least one processor, an intermediate set of at least one optimal and stable spot instance from the at least one optimal spot instance based on the stability score of the at least one optimal spot instance;

predicting, by the at least one processor, the combination of optimal and stable instances, wherein the combination of optimal and stable instances is based on at least on the cost factors, and based on at least one of the intermediate set of at least one optimal and stable spot instance and a set of optimal on-demand instances, wherein the optimal on-demand instances, different from the optimal and stable instances, which are provisioned at fixed cost independent of bidding or historical reliability;

presenting the combination of optimal and stable instances to a user via the communication interface for selection; and executing the application by the selected combination of optimal and stable instances.

2. The method according to claim 1, wherein the at least one parameter includes at least a size, a computation complexity, and a memory.

3. The method according to claim 1, wherein each of the at least one parameter is assigned a weightage.

4. The method according to claim 3, wherein the combination of optimal and stable instances is predicted based on the weightage.

5. The method according to claim 1, wherein the historical performance data of the at least one spot instance comprises a spot instance interruption frequency of the at least one spot instance for a pre-defined period of time.

6. The method according to claim 1, wherein the at least one processor implements a machine learning model, wherein the machine learning model is trained by the at least one processor.

7. The method according to claim 6, wherein the training of the machine learning model by the at least one processor, comprises:

obtaining, by the at least one processor via the communication interface, a user feedback information of the combination of optimal and stable instances from at least one user; and updating, by the at least one processor, the machine learning model implemented by the at least one processor based on the user feedback information and the combination of optimal and stable instances.

8. A computing device for predicting a combination of optimal and stable instances, the computing device comprising:

a processor;

a communication interface;

a memory unit connected to the processor and the communication interface, wherein the processor is configured to:

receive, via the communication interface, a configuration information of an application for execution by the combination of optimal and stable instances, wherein the combination of optimal and stable instances is hosted by a host platform, wherein "optimal" refers to instances selected based on performance and cost factors, and "stable" refers to instances selected based on historical reliability and availability factors;

identify at least one parameter related to the application;

identify at least one optimal instance based on the identified at least one parameter, wherein the at least one optimal instance comprises at least one optimal spot instance;

fetch historical performance data of at least one spot instance from the host platform;

predict a stability score for the at least one optimal spot instance based on at least the historical performance data of the at least one spot instance;

predict an intermediate set of at least one optimal and stable spot instance from the at least one optimal spot instance based on the stability score of the at least one optimal spot instance;

predict the combination of optimal and stable instances, wherein the combination of optimal and stable instances is based on at least on the cost factors, and is based on at least one of the intermediate set of at least one optimal and stable spot instance and a set of optimal on-demand instances, wherein the optimal on-demand instances, different from the optimal and stable instances, which are provisioned at fixed cost independent of bidding or historical reliability;

present the combination of optimal and stable instances to a user via the communication interface for selection; and execute the application by the selected combination of optimal and stable instances.

9. The computing device according to claim 8, wherein the at least one parameter includes at least a size, a computation complexity, and a memory.

10. The computing device according to claim 8, wherein each of the at least one parameter is assigned a weightage.

11. The computing device according to claim 10, wherein the combination of optimal and stable instances is predicted based on the weightage.

12. The computing device according to claim 8, wherein the historical performance data of the at least one spot instance comprises a spot instance interruption frequency of the at least one spot instance for a pre-defined period of time.

13. The computing device according to claim 8, wherein the processor implements a machine learning model, wherein the machine learning model is trained by the processor.

14. The computing device according to claim 13, wherein the processor for training of the machine learning model, is further configured to:

obtain, via the communication interface, a user feedback information of the combination of optimal and stable instances from at least one user; and update the machine learning model implemented by the processor based on the user feedback information and the combination of optimal and stable instances.

15. A non-transitory computer readable storage medium storing instructions for predicting a combination of optimal and stable instances, the storage medium comprising executable code which, when executed by a processor, causes the processor to:

receive via a communication interface, a configuration information of an application for execution by the combination of optimal and stable instances, wherein the combination of optimal and stable instances is hosted by a host platform, wherein "optimal" refers to instances selected based on performance and cost factors, and "stable" refers to instances selected based on historical reliability and availability factors;

identify at least one parameter related to the application;

identify at least one optimal instance based on the identified at least one parameter, wherein the at least one optimal instance comprises at least one optimal spot instance;

fetch historical performance data of at least one spot instance from the host platform;

predict a stability score for the at least one optimal spot instance based on at least the historical performance data of the at least one spot instance;

predict an intermediate set of at least one optimal and stable spot instance from the at least one optimal spot instance based on the stability score of the at least one optimal spot instance;

predict the combination of optimal and stable instances, wherein the combination of optimal and stable instances is based the cost factors, and is based on at least one of the intermediate set of at least one optimal and stable spot instance and a set of optimal on-demand instances, wherein the optimal on-demand instances, different from the optimal and stable instances, which are provisioned at fixed cost independent of bidding or historical reliability;

present the combination of optimal and stable instances to a user via the communication interface for selection; and execute the application by the selected combination of optimal and stable instances.

16. The non-transitory computer readable storage medium according to claim 15, wherein the at least one parameter includes at least a size, a computation complexity, and a memory, and each of the at least one parameter is assigned a weightage.

17. The non-transitory computer readable storage medium according to claim 16, wherein the combination of optimal and stable instances is predicted based on the weightage.

18. The non-transitory computer readable storage medium according to claim 15, wherein the historical performance data of the at least one spot instance comprises a spot instance interruption frequency of the at least one spot instance for a pre-defined period of time.

19. The non-transitory computer readable storage medium according to claim 15, wherein when executed by the processor, the executable code further causes the processor to implement a machine learning model, wherein the machine learning model is trained by the processor.

20. The non-transitory computer readable storage medium according to claim 19, wherein when executed by the processor, the executable code further causes the processor to train the machine learning model which is further configured to:

obtain, via the communication interface, a user feedback information of the combination of optimal and stable instances from at least one user; and update, the machine learning model implemented by the processor based on the user feedback information and the combination of optimal and stable instances.

* * * * *